(12) United States Patent
Garcia-Ochoa

(10) Patent No.: US 6,210,774 B1
(45) Date of Patent: *Apr. 3, 2001

(54) STRUCTURAL ELEMENT

(76) Inventor: Jorge-Isaac Garcia-Ochoa, Martin de Zavala 425 sur, Monterrey, N.L. 64000 (MX)

(*) Notice: Subject to any disclaimer, the term of this patent is extended or adjusted under 35 U.S.C. 154(b) by 0 days.

This patent is subject to a terminal disclaimer.

(21) Appl. No.: 09/343,292

(22) Filed: Jun. 30, 1999

Related U.S. Application Data

(62) Division of application No. 08/522,462, filed on Aug. 31, 1995, now Pat. No. 5,958,551.

(30) Foreign Application Priority Data

Dec. 16, 1994 (MX) .................................................. 949826

(51) Int. Cl.⁷ ........................................................ B32B 3/10

(52) U.S. Cl. ........................... 428/137; 428/138; 428/178

(58) Field of Search ..................................... 428/137, 131, 428/72, 138, 178; 52/783.1

(56) References Cited

U.S. PATENT DOCUMENTS

| | | | | |
|---|---|---|---|---|
| 3,086,899 | * | 4/1963 | Smith et al. | 428/178 |
| 4,197,341 | * | 4/1980 | Rule | 428/182 |
| 4,348,422 | * | 9/1982 | Figgie | 428/178 |
| 4,614,000 | * | 9/1986 | Mayer | 428/178 |
| 4,631,221 | * | 12/1986 | Disselbeck et al. | 428/166 |
| 4,889,758 | * | 12/1989 | Rinkenich | 428/178 |
| 4,931,346 | * | 6/1990 | Dardina | 428/182 |
| 5,124,191 | * | 6/1992 | Seksaria | 428/178 |
| 5,182,158 | * | 1/1993 | Schaeffer | 428/178 |
| 5,273,806 | * | 12/1993 | Luckghan et al. | 428/107 |
| 5,958,551 | * | 9/1999 | Garcia-Ochia | 428/137 |

\* cited by examiner

Primary Examiner—Donald J. Loney
(74) Attorney, Agent, or Firm—Abelman, Frayne & Schwab

(57) ABSTRACT

Structural element characterized by its rigidity and very light weight per unit but simpler and readily formed at every scale, which is constructed using a first piece or preform which comprises a plurality of projections and a second piece which can be a second preform, a sheet or a mesh, wherein both pieces are fixed by means of the plurality of tips of the plurality of projections fixing them by any fixing means appropriate to the materials used and to the application of the structural element.

17 Claims, 3 Drawing Sheets

STRUCTURAL ELEMENT

CROSS-REFERENCE TO RELATED APPLICATION

This is a divisional application of U.S. application Ser. No. 08/522,462, filed on Aug. 31, 1995 now U.S. Pat. No. 5,958,551.

BACKGROUND OF THE INVENTION

This invention relates in general to the structural support for light weight panels. More specifically it relates to structural elements which comprise preforms of any moldable, deformable or laminar material like paper, cardboard, plastics, reinforced resins, metals, alloys, compound materials, agglomerates, asbestos, gypsum, ceramic, glass or any other similar material, any of which is formed in such a way as to have a very high structural resistance to compression and to flexure, maintaining a low weight and having a configuration which allows to comprise support points to which other preforms or sheets of any material can be affixed to construct the structure elements.

The technical aspects and advantages of structural sandwich panels are well known, because they have been used for structures that require a very high resistance and a very low structural weight. The so called honeycomb sandwich panels are well known among this type of panels. In this type of structures, the panel is constructed by means of strips of the material used that are fixed together at some points in such a way that the hexagonal honeycomb is established, in which such honeycombs extend perpendicularly to the sheet or sheets with which the sandwich is constructed. The strips that form the honeycomb extend longitudinally in a cross sectional way to the sheet or sheets that form the sandwich. This means that the strips forming the honeycomb extend perpendicularly to the sheets that form the sandwich panel. Other configurations different to hexagonal can be used like triangular, pentagonal, etc.

Different materials can also be used for the construction of sandwich panels, both for the core as well as for the sheets that form the walls of the sandwich. Such materials can be for example, paper, cardboard, plastic, metal and composite materials. The basis of the sandwich panels rest in keeping a core that work as a perpendicular structure support for the panel, while other configurations adopted throughout the time, allow to distribute the effort applied all over the panel in a more or less homogenous manner, which allow to decrease up to ten times the weight of the structural element in comparison with traditional structural elements formerly used, keeping under the same conditions the under load support capacity. This type of structures have had huge advantages by supporting the same loads at a fraction of the weight and cost of prior structural elements.

Different methods to build sandwich panels by diverse techniques have been discussed. A notable example could be found in U.S. Pat. No. 5,028,474 dated Jul. 2, 1991, granted to Ronald M. Czaplicki entitled Cellular Core Structure providing Gridlike Bearing Surfaces on Opposing Parallel Planes of the Formed Core.

Among the inventions made to give structural cores to sandwich panels is U.S. Pat. No. 3,865,679 dated Feb. 11, 1975, granted to Jesse R. Hale, entitled Sandwich Panel having Cellular Core Structure with Reinforcing Elements, which teaches a core structure that has nodes, shown in essentially circular manner, that project in opposed directions form a mid plane with apices of said nodes abutted against the face sheets of the panel, comprising first reinforcing bar means running along to the sides of a first row of said nodes, wherein said bar means are bonded to the sides of said nodes of said center and to the surface of one of the face sheets of the panel and a second reinforcing bar means that run along of a second row of said nodes, wherein said second reinforcing bar means are bonded to the surface of one of the face sheets. This patent comprises as improvement the addition of reinforcing bars that are bonded to the face sheets of the nodes along two different rows of nodes and are bonded by the ends to the face sheets of the sandwich panel. It is evident that the structure used in this invention, requires an additional reinforcement to support the stress that will be applied to the panel and will not be discussed in more detail.

In U.S. Pat. No. 5,028,474 above described, in a three dimensional structure that comprises ridges and essentially lineal valleys which establish spaced rows of adjacent inclined rectangular shaped facits connected by intermediate rows of adjoining parallelogram-shaped facets, wherein said structure is made by folding of a continuous unbroken sheet material, wherein said laminate material has a superficial area and said superficial area is filled of a repetitive path of cellular units. The central structure provides support surfaces of the grid type in two support plan parallel opposed to which the plates or sheets can be fixed as faces to form the panel in the form of a sandwich.

From the prior description and the accompanying drawings to the patent of Czaplicki, it should be appreciated the problem to establish the actual way in which the plate or sheet is folded, which finally constitutes a three dimensional figure but with different geometric figures. This relative obstacle to fold the plate or sheet does not allow to adequately appreciate the value of this invention.

U.S. Pat. No. 5,182,158 dated Jan. 26, 1993, granted to Barnarr C. Shaeffer titled Lightweight Sandwich Panel, wherein in a sandwich panel which comprises external layers which has projections bonded to the other external layer, wherein the projections have relatively flat areas in their edges, in the edges freed to provide enlarged areas for bonding, wherein the flat areas are bonded chemically to the other external layer, the core layer is a plastic sheet and the projections are formed from the sheet and the projections by area would vary in density to provide different resistances to the deflection in various parts of the panel, wherein one of the external layers is transparent and the core layer is dark to absorb the sun's ray and is open to the passage of air through it. It can be clearly appreciated from the prior description that the patent to Schaeffer has been designed for its application to aviation in general, wherein it can be appreciated in FIGS. 2 to 4 that different cross section sheets are used also bonded to form a honeycomb. In FIG. 5 it could be appreciated a structure with steep projections. The instant invention differs from Shaeffer as will be herein further described. From the foregoing it could be appreciated that these structures in the form of sandwich are formed by three or more pieces, which makes very complex its construction, structure or use. Diverse geometrical shape panels with thin metallic sheets have also widely been described, like in U.S. Pat. Nos. 3,209,507; 3,622,430; 3,834,487 and 3,938,963, or there are also inclusive those patents which illustrate systems of the multiconical type as U.S. Pat Nos. 4,672,780 and 4,794,742, but in none of these cases, these patents have the advantages of the instant invention.

SUMMARY OF INVENTION

According to the foregoing, it is an object of the present invention to provide a structural element with a simpler design and improved properties respect to the prior art.

It is another object of the present invention to provide a structual element with outstanding structural features and of relatively easy and very economic construction.

It is still another object of the present invention, to provide a structural element with a three dimensional structure, which comprises at least a deformable or moldable continuous material preform along all of which a plurality of projections are formed in successive or simultaneous steps in such a way that the projections can be generally but not necessarily symmetrical.

Still a further object of the invention, is to provide a structural element that is susceptible of being lightened by withdrawing all the unnecessary material to make the functions of support and structural reinforcement given by the structural element and besides increasing its possibilities of application.

It is still an object of the invention, to provide a structural element which is susceptible of being manufactured by units, lots or continuously, comprising a first piece of a material and a second piece of the same or different material.

The present invention comprises a structural element starting basically with two pieces made or formed with a laminate material, projections are made together or very close to each other to one or both pieces in a regular or irregular manner. These projections can be pyramids, or prisms of square, rectangular, triangular or hexagonal base, etc., complete or truncated and with right or rounded edges or of any other type, inclusive cones or ovoids, etc. Whenever at least a preform is joined together to another piece which may be a smooth surface, another preform or any combination, they form a structural element. Formed panels are flexible and can be given any wanted shape to be flat or curved, but upon fixing the tips of the projections of the first piece fixed to the second piece which can have a smooth surface, other preform, another piece that can be prepared to facilitate the fixing, or a mesh, a three dimensional structure is built that maintains its given shape with great rigidity and very low weight, which structure besides the thickness of the formed panel give to such panel extraordinary resistance to flexion and to perpendicular compression. Any material can be used to manufacture these structures being the most convenient that which allow a continuous massive production like: metals, alloys, plastics, rubber, paper, cardboard, composite or agglomerated materials, reinforced resins, concrete, gypsum, ceramic materials, asbestos, glass and others. The two pieces that form the panel can be manufactured with the same or different material. Any reinforcement can be added within the structure to increase the resistance and if convenient any nonconductor or filling material and externally faces can be put which complete the finishing and improve the appearance, giving as a result a sandwich panel. As in most of the cases it will be convenient to prebuild the structural elements for using them in another place, fixing means can be added to the edges to fix the panels to each other and to fix the panels to other portions of a construction, building or final product. The structure can have any thickness, though the most common will be between 5 and 150 millimeter, nonetheless it is possible to build smaller or bigger panels to an extent in which the projections could be arranged in little groups or alone to be fixed one to the other and at the same time to the other portion of the structure. This type of structure can be lightened by withdrawing the material of the sides of the projections and or the faces located between the joining points of the second piece achieving simultaneously a permeable structual element that serves as a support to other materials as would be prebuilt elements of construction. It is also possible to use a plurality of projections of different shape and size as a preparation for bending before fixing, as it would be for the manufacture of beams or other structural elements. Equally it is also possible to prepare the structual element to ease the joining of the two pieces or to add other features, like adding some projections to make it antislipping. The flexibility of the instant invention allows a prior manufacture of the preform to build the panels thereafter when the application takes place. Depending on the materials used the structual elements also can be used as buffer elements, for isolation, decoration, stage scenes, reflection diffusion and lots more. It should be appreciated that this type of structual elements is easier to manufacture than normal sandwich panels lowering the cost which allows to use its advantages of light weight and rigidity at an affordable price.

BRIEF DESCRIPTION OF THE DRAWINGS

The novel features and advantages of the instant invention should be readily apparent for those skilled in the art arising from the teachings of the detailed description herein and the accompanying drawings, but it should be understood that the instant invention can be embodied in different ways and that the embodiments herein described are shown for illustration purposes only, but that they are not restrictive as referred to the scope of the invention wherein.

DETAILED DESCRIPTION OF THE INVENTION

Figure 1:
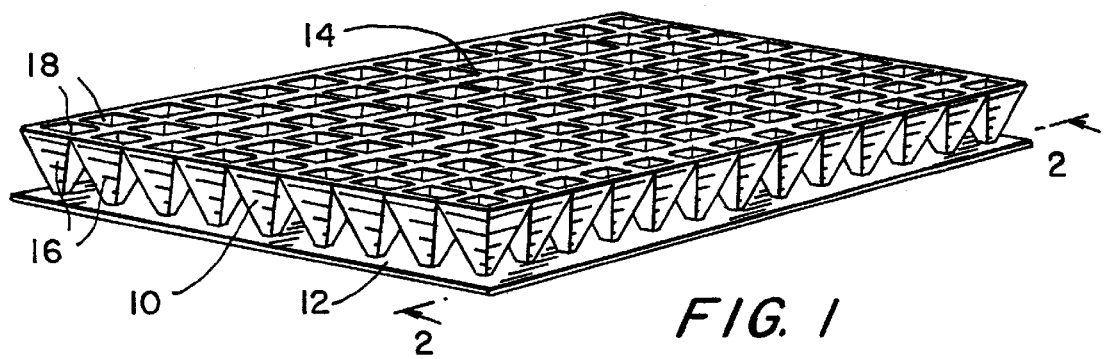
FIG. 1 is a perspective view of the preform and sheet type panel.

With reference to FIG. 1, numeral 10 generally designates a first piece or preform which can be fixed to a second piece or sheet 12, which acts as a joining surface of the tips of the geometric shapes used in the first piece or preform 10 to fix them in place. Once the preform 10 and the second piece or sheet 12 are fixed, they form the structural element 14, which can be a part of a plurality of articles which can be applied to the building industry. During the forming process of preform 10, the relatively flat bottoms of every geometric shape formed and the resulting material between them form a face of the structural elements which can be added another laminar piece which depends on the desired finishing for the particular application.

Figure 2:
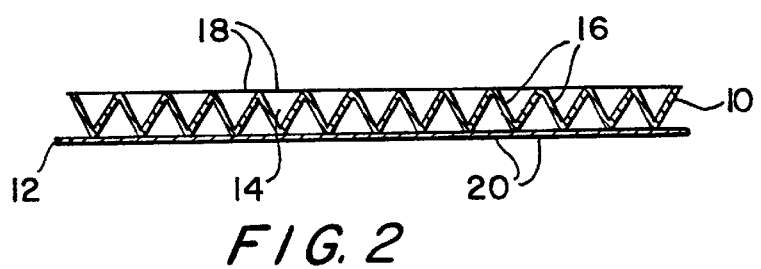
FIG. 2 is a cross cut view along AA' axis of the panel of FIG. 1.

In FIG. 2, a cross cut along AA' axis of structural element 14 can be seen, wherein the geometric shapes of preform 10 can be clearly seen, sheet 12 fixed to preform 10 by tips 20 and how it is firmly supported by projections 16 and how bottoms 18 of projections 16 establish a relatively flat continuous surface, wherein it can be appreciated that another sheet 12 is unnecessary on the opposite side to that which sheet 12 is fixed to preform 10, because the particular system formed by bottoms 18 which are formed longitudinally and transversely to preform 10, give enough rigidity to structual element 14 so any additional support is unnecessary.

Figure 3:
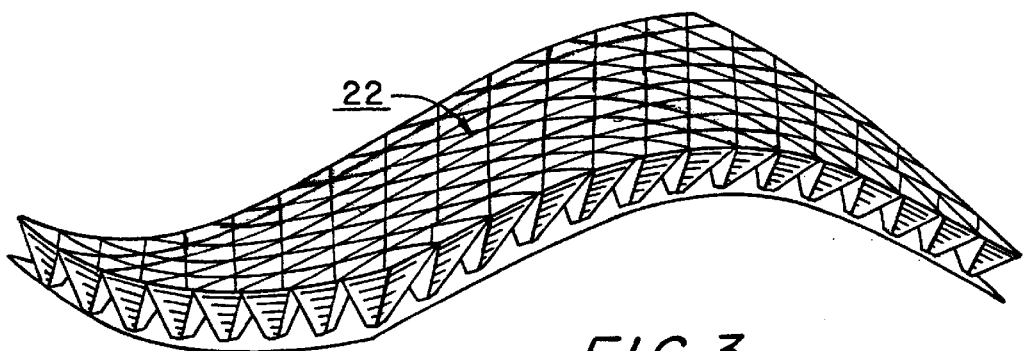
FIG. 3 is a view of a formed panel.

In FIG. 3, a panel 22 is shown to illustrate the different shapes that this type of panel can have.

Figure 4:
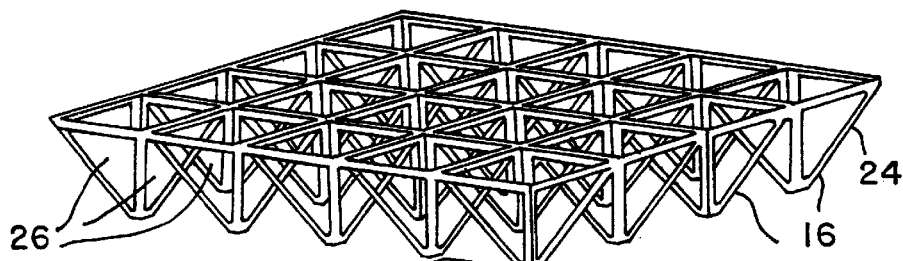
FIG. 4 is a perspective view of an embodiment of the present invention wherein a portion of the material of the walls of the projections and of the spaces between the joining points is withdrawn to lighten the panel as to form a panel with modified properties.
Figure 4:
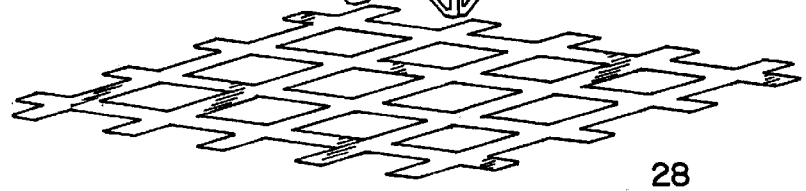

In FIG. 4, it is shown a hollowed preform 24 to which a portion of the material of sides 26 of projections 16 and material between the joining points of sheet 28 has been withdrawn. This embodiment allows to lighten the structure to apply it to such articles or building applications that require a strict control of the total weight while maintaining the rigidity of the whole structure, or when it is desired to have a permeable panel which allows the passage of other objects or filling materials.

Figure 5:
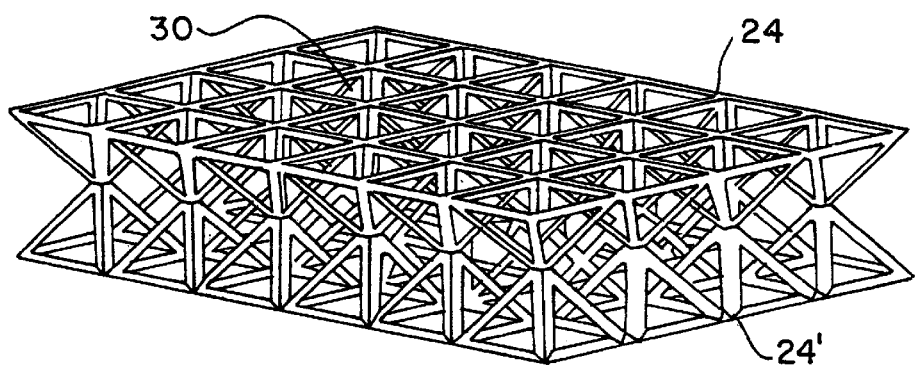
FIG. 5 is a perspective view of another embodiment of the invention wherein a panel with two preforms is shown, both preforms are lightened and fixed by the tips and have recesses in their solid faces.

FIG. 5 shows another embodiment of the invention wherein two hollowed preforms are fixed by their tips as to form a panel by a first piece or preform 24 and a second preform 24', which form panel 30. This type of panel can also be formed with other shapes and sizes to maintain an adequate ratio to allow the tips of both preforms 24, and 24' to register in place to establish the joining points to fix the preform and form the panel even though such panel has a different to flat shape.

Figure 6:
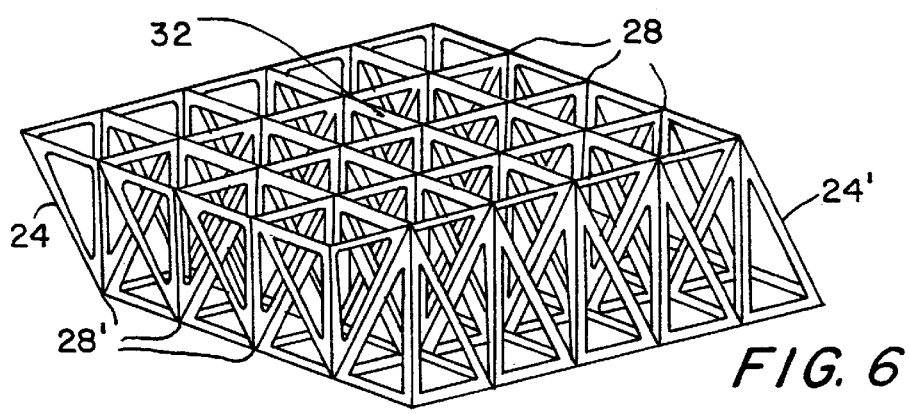
FIG. 6 is a perspective view of a fourth embodiment of the invention wherein a panel is formed with two lightened preforms, and which are joined fixing the tips of the projetions of one preform with the bottoms of the projections of the other preform.

FIG. 6 shows other embodiment of the invention, wherein a first hollowed preform 24 is fixed to a second hollowed preform 24' as to fix the tips of first preform 24 to the recesses in the inner portion between projections 28' of second preform 24' while fixing the tips of second preform 24' to the recesses in the inner portion between projections 28 of first preform 24 to form panel 32. This configuration allows to fix to some points the sides of projections 28 and 28' of both preform to give an increased resistance to the structure. In this figure hollowed preforms were used that were lightened by withdrawing a portion of material to the sides of the projections, but in the case in which preforms were complete continuous surfaces they could establish closed spaces between every four projections two of every preform, wherein faces can be applied to both sides of the panel giving a plurality of closed spaces adjacent one to the other with superb isolating and buffering features besides its properties of light weight, resistance and ease of manufacture derived from the main principle of the invention.

Figure 7:
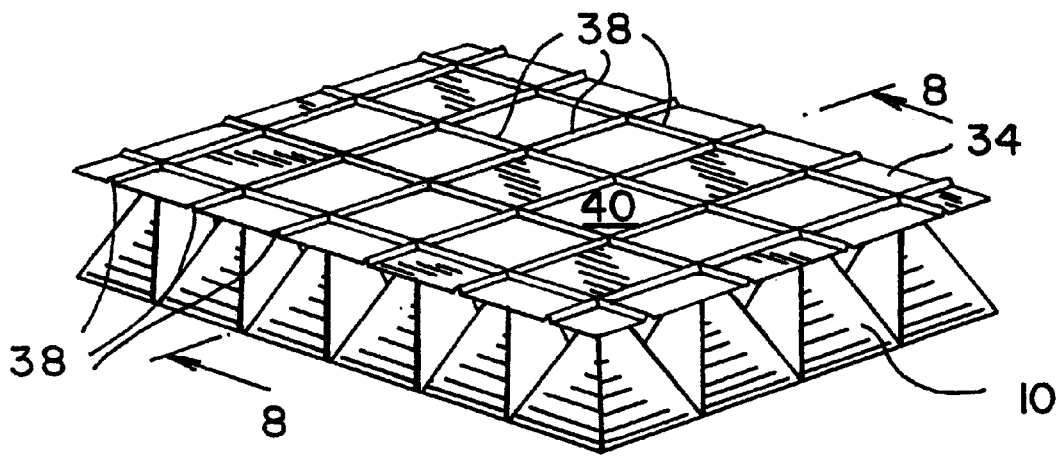
FIG. 7 is a perspective view of a panel formed with a sheet with recesses which are used to fix the preform, wherein said recesses are also used as anti slipping projections.

FIG. 7 shows a view of another embodiment of the invention, wherein a first piece or preform 10 is fixed to a second piece 34, which has recesses 36 comprised on the inner face of second piece 34, which comprise a plurality of projections 38 in the external face of said second piece 34, once fixed the first piece 10 to second piece 34 they form panel 40, which has special characteristics because of the projections which can give the surface an antislipping property when the construction element is used for floors or the like.

Figure 8:
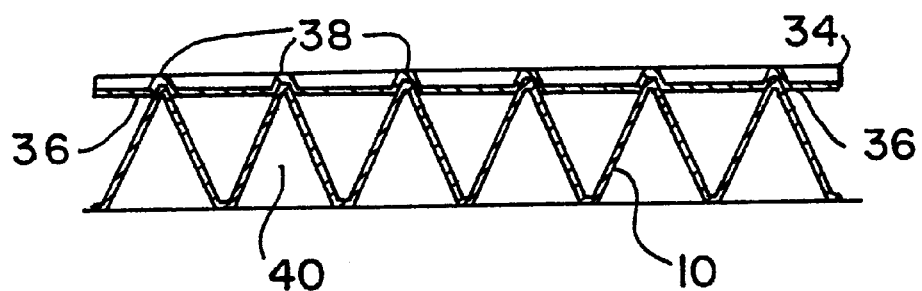
FIG. 8 is a cross cut view along BB' axis wherein the projection tips shown can be seen fixing to the sheet in the recesses formed in the plate.

FIG. 8, shows a cross cut along BB' axis of panel 40 in FIG. 7, wherein recesses 36 can be readily appreciated comprised in the inner face of second piece 34, and the way in which said recesses are used to receive inside them the tips of projections of first piece or preform 10 to fix both pieces and to form panel 40. Projections 38 can also be appreciated as established on the exterior face of second piece 34 and which give to the panel improved properties over the panels of prior art.

From the foregoing description it should be appreciated that multiple changes and modifications can be made to both first and second pieces and to the whole structual element once it is formed as to make a plurality of structual elements adapted to different uses and based on their structural rigidity, light weight and also on their structural shape which allows to make precise bendings which also can be used for decoration. It should be understood that the foregoing description and the different embodiments of the invention are used herein for illustration purposes but are not limitative and that this modifications are within the scope and spirit of the invention.

What I claim is:

1. Structural element which comprises a first piece and a second piece wherein at least said first piece comprises a plurality of projections which comprise different geometric shapes and sizes which establish a preform wherein said projections of said first piece are fixed to said second piece which upon fixing establishes a very rigid, resistant to flexure and light weight tridimensional structure, at least one of said first piece and said second piece being hollowed and having a plurality of open apertures through at least one wall of said at least one of said first piece and said second piece to lighten the element and to allow the passage of other objects or materials.

2. Structural element according to claim 1, wherein said projections of said first piece are fixed by means of a plurality of recesses comprised on an inner face of said second piece.

3. Structural element according to claim 1, wherein both pieces are similar and wherein the projections of said first piece are fixed to the projections of said second piece.

4. Structural element according to claim 1, wherein both pieces are similar and the projections of said first piece are fixed to recesses between the projections of the second piece.

5. Structural element according to claim 1, wherein said second piece is a mesh.

6. Structural element according to claim 1, wherein said element has structural projections with different shapes and sizes to have a final shape by means of bending or curving before fixing.

7. Structural element according to claim 1, wherein said element is made by means of bending and curving said piece and fixing its projections on itself.

8. Structural element according to claim 1, wherein said pieces of said element comprise a deformable, moldable or laminar material.

9. Structural element according to claim 1, wherein said element comprises pieces made of the same material.

10. Structural element according to claim 1, wherein said element comprises pieces made of different materials.

11. Structural element according to claim 1, wherein at least one of the pieces comprise a face and finishing.

12. Structural element according to claim 1, wherein said element comprises reinforcements.

13. Structural element according to claim 1, wherein a filling material is added to the structural element.

14. Structural element according to claim 1, wherein at least one of the pieces is adapted for fixing or installation.

15. Structural element according to claim 1, wherein at least one of the pieces comprises fixing means.

16. Structural element according to claim 1, wherein said element further comprises at least one additional piece, each of said at least one additional piece having at least one of the following characteristics:
- a. having projections similar to said first piece; and
- b. being fixed to projections of another piece, said fixation being similar to the fixation of said second piece.

17. Structural element according to claim 1, wherein said projections of said first piece are fixed to said second piece which comprises a relatively smooth surface.

\* \* \* \* \*